United States Patent
Goto et al.

(10) Patent No.: US 12,485,254 B2
(45) Date of Patent: Dec. 2, 2025

(54) BALLOON CATHETER AND BALLOON ARRANGEMENT METHOD

(71) Applicant: TERUMO KABUSHIKI KAISHA, Tokyo (JP)

(72) Inventors: Hiroshi Goto, Kanagawa (JP); Yasuo Kurosaki, Kanagawa (JP)

(73) Assignee: TERUMO KABUSHIKI KAISHA, Tokyo (JP)

( * ) Notice: Subject to any disclaimer, the term of this patent is extended or adjusted under 35 U.S.C. 154(b) by 850 days.

(21) Appl. No.: 17/448,257

(22) Filed: Sep. 21, 2021

(65) Prior Publication Data

US 2022/0001147 A1    Jan. 6, 2022

Related U.S. Application Data

(63) Continuation of application No. PCT/JP2020/012226, filed on Mar. 19, 2020.

(30) Foreign Application Priority Data

Mar. 22, 2019  (JP) .................................. 2019-055362

(51) Int. Cl.
    *A61M 25/00* (2006.01)
    *A61M 25/10* (2013.01)

(52) U.S. Cl.
    CPC . *A61M 25/1002* (2013.01); *A61M 2025/1004* (2013.01); *A61M 2025/105* (2013.01); *A61M 2025/1075* (2013.01)

(58) Field of Classification Search
    CPC ........ A61M 25/1038; A61M 2025/105; A61M 25/1029; A61M 2025/1031;
    (Continued)

(56) References Cited

U.S. PATENT DOCUMENTS

2002/0163104 A1  11/2002  Motsenbocker et al.
2003/0083579 A1  5/2003   Aita et al.
(Continued)

FOREIGN PATENT DOCUMENTS

CN   105268087 A   1/2016
CN   205041957 U   2/2016
(Continued)

OTHER PUBLICATIONS

Office Action (The First Office Action) issued Feb. 2, 2023, by the State Intellectual Property Office of People's Republic of China in corresponding Chinese Patent Application No. 202080007101.5 and an English translation of the Office Action. (23 pages).

(Continued)

*Primary Examiner* — William R Carpenter
(74) *Attorney, Agent, or Firm* — .Buchanan Ingersoll & Rooney PC

(57) ABSTRACT

A balloon catheter and a method for arranging a balloon are disclosed, which are capable of suppressing the separation of a drug with which an outer surface of a balloon is coated. A balloon catheter in which a balloon with an outer surface coated with a drug is disposed to an inside of a protective tube, in which: the balloon includes a plurality of wing portions that protrude radially outward, and a plurality of base portions that are in contact with an inner tube; each of the plurality of wing portions include a wing distal end portion that is positioned on a protruding side, a wing proximal end portion that is connected to the base portion, and a wing middle portion that is positioned between the wing distal end portion and the wing proximal end portion.

19 Claims, 6 Drawing Sheets

(58) Field of Classification Search
CPC .. A61M 2025/1075; A61M 2025/1086; A61M 25/1034; A61M 2025/1004; A61M 25/1002
See application file for complete search history.

(56) References Cited

U.S. PATENT DOCUMENTS

| | | | |
|---|---|---|---|
| 2007/0129748 A1* | 6/2007 | Eidenschink | A61M 25/10 606/192 |
| 2008/0114331 A1* | 5/2008 | Holman | A61M 25/1002 604/509 |
| 2009/0299283 A1 | 12/2009 | Flanagan | |
| 2011/0046724 A1* | 2/2011 | Heilmann | A61B 17/12109 623/1.46 |
| 2011/0099789 A1* | 5/2011 | Ewing | A61L 29/08 427/2.25 |
| 2013/0302381 A1* | 11/2013 | Barnett | A61K 31/337 427/2.3 |
| 2016/0001049 A1 | 1/2016 | Nakagawa et al. | |
| 2016/0346072 A1 | 12/2016 | Kawashima | |
| 2019/0009064 A1* | 1/2019 | Murata | A61P 9/00 |
| 2022/0001148 A1 | 1/2022 | Kurosaki et al. | |

FOREIGN PATENT DOCUMENTS

| | | |
|---|---|---|
| CN | 108601930 A | 9/2018 |
| JP | 2004525704 A | 8/2004 |
| JP | 2005211492 A | 8/2005 |
| JP | 2017060614 A | 3/2017 |
| JP | 2017169740 A | 9/2017 |
| WO | 2015122218 A1 | 8/2015 |
| WO | 2017139357 A1 | 8/2017 |
| WO | 2017164281 A1 | 9/2017 |
| WO | 2018067875 A1 | 4/2018 |

OTHER PUBLICATIONS

International Search Report (PCT/ISA/210) with translation and Written Opinion (PCT/ISA/237) mailed on Jun. 16, 2020, by the Japanese Patent Office as the International Searching Authority for International Application No. PCT/JP2020/012227.
International Search Report (PCT/ISA/210) with translation and Written Opinion (PCT/ISA/237) mailed on Jun. 2, 2020, by the Japanese Patent Office as the International Searching Authority for International Application No. PCT/JP2020/012226.
Office Action (Notice of Reasons for Refusal) issued Jun. 5, 2023, by the Japan Patent Office in corresponding Japanese Patent Application No. 2021-509298 and an English translation of the Office Action. (14 pages).

* cited by examiner

BALLOON CATHETER AND BALLOON ARRANGEMENT METHOD

CROSS-REFERENCES TO RELATED APPLICATIONS

This application is a continuation of International Application No. PCT/JP2020/012226 filed on Mar. 19, 2020, which claims priority to Japanese Patent Application No. 2019-055362 filed on Mar. 22, 2019, the entire content of both of which is incorporated herein by reference.

FIELD OF THE DISCLOSURE

The present disclosure generally relates to a balloon catheter and a balloon arrangement method.

BACKGROUND DISCUSSION

In recent years, balloon catheters are used for improving a lesion area generated in a living body lumen. The balloon catheter is normally provided with an elongated shaft, and a balloon that is provided at distal end side of the shaft and is capable of inflating in a radial direction. The deflated balloon is caused to reach to a target location inside the body through a thin living body lumen and after reaching the target location, the balloon is inflated, whereby it is possible to expand a lesion area.

However, the lesion area can be forcedly expanded, which can result in excessive propagation of smooth muscle cells, whereby a new stenosis (restenosis) may be developed in the lesion area in some cases. Therefore, a drug-coated balloon (DCB) in which an outer surface of the balloon is coated with a drug for suppressing a stenosis has been used recently. The drug eluting balloon inflates to release the drug coated on the outer surface to the lesion area, and thus can suppress the restenosis.

Generally, a balloon is folded so as to be wound around a shaft of the catheter in order to be deflated to a small diameter. For example, Japanese Patent Application Publication No. 2004-525704 A describes that wing portions protruding outward in a radial direction of a balloon are pleated on the balloon, and the wing portions are folded so as to be wound around a shaft of a catheter.

If adjacent wing portions of the balloon contact each other, there is a possibility that drug-coated layers on the wing portions contact each other, and are separated. Moreover, the balloon is housed in a protective tube in order to protect the drug-coated layer on the surface in some cases. In this case, contact between the drug-coated layer and the protective tube can easily cause the separation of the drug-coated layer. Moreover, when the balloon catheter is retained or transported, the vibration acts on the balloon catheter in some cases. In such a case, the contact between the drug-coated layers and the contact between the drug-coated layer and the protective tube can also easily cause the separation of the drug-coated layer.

SUMMARY

A balloon catheter and a balloon arrangement method are disclosed, which are capable of suppressing the separation of a drug with which an outer surface of a balloon is coated.

A balloon catheter is disclosed, which includes: a balloon with an outer surface coated with a drug; a protective tube in which the balloon in a state of being folded on an outer peripheral surface of a shaft of the balloon catheter is arranged on an inside of the protective tube, in which: the balloon includes a plurality of wing portions that are bent toward a same direction in a circumferential direction of the shaft while protruding radially outward of the balloon, and a plurality of base portions that are in contact with the shaft; each of the plurality of wing portions includes a wing distal end portion that is positioned on a protruding side, a wing proximal end portion that is connected to the base portion, and a wing middle portion that is positioned between the wing distal end portion and the wing proximal end portion; the wing distal end portion includes a wing distal end outer portion that is directed to a side of the protective tube, and a wing distal end inner portion that is directed to a side of the shaft; the wing distal end outer portion contacts an inner peripheral surface of the protective tube; inner surfaces of the balloon contact each other to pleat the wing middle portion; and the wing middle portion and the wing proximal end portion are separated from the inner peripheral surface of the protective tube.

In the balloon catheter configured as the above, sites of the balloon other than the wing distal end outer portion come into no approximate contact with the protective tube, which can help suppress the separation of the drug caused by the balloon contacting the protective tube. Moreover, inner surfaces of the balloon contact each other in the wing middle portion to pleat the wing portion to be thin, so that the wing portion is difficult to contact other sites of the balloon, which can help suppress the separation of the drug caused by the wing portion contacting other sites of the balloon.

The wing middle portion may include the wing middle outer portion that is directed to the side of the protective tube, and the wing middle inner portion that is directed to the side of the shaft, and the wing middle inner portion may be separated from the adjacent another wing portion and the base portion. Accordingly, spaces are formed between the adjacent wing portions and between the wing portion and the base portion, respectively, which can help suppress the separation of the drug caused by the wing portion contacting another wing portion and the base portion.

The wing distal end inner portion may be separated from the adjacent another wing portion and the base portion. Accordingly, spaces are formed between the adjacent wing portions and between the wing portion and the base portion, respectively, which can help suppress the separation of the drug caused by the wing portion contacting another wing portion and the base portion.

In the entire wing middle portion, inner surfaces of the balloon may contact each other. Accordingly, the entire wing middle portion is pleated to be thin, so that spaces are likely to be formed between the adjacent wing portions and between the wing portion and the base portion, respectively, which can help suppress the separation of the drug caused by the wing portion contacting another wing portion and the base portion.

The flexible protective film that is sandwiched between the protective tube and the balloon may be included. Accordingly, a drug on the outer surface of the balloon contacts the protective tube via the flexible protective film, so that the separation of the drug can be suppressed. Moreover, the protective tube is provided to allow the balloon to be inserted into the protective tube, and to be taken out from the protective tube in the state where the balloon is kept to be covered with the protective film. Therefore, when the balloon is inserted into the protective tube and/or when the balloon is taken out from the protective tube, the separation of the drug caused by rubbing of the wing portions against the protective tube can be suppressed.

A method of arranging the balloon of a balloon catheter in which the balloon with an outer surface coated with a drug is disposed on an outer peripheral surface of a shaft so as to be inflatable, to an inside of a protective tube, including: pleating a plurality of wing portions that protrude radially outward, and a plurality of base portions that are in contact with the shaft, while reducing pressure in an inside of the balloon; bending the plurality of wing portions to a same direction in a circumferential direction of the shaft while holding a pressure-reduced state in the inside of the balloon; and inserting the balloon into the protective tube while holding the pressure-reduced state in the inside of the balloon.

In the method of arranging the balloon configured as the above, it is possible to insert the balloon into the protective tube while holding the shape of the folded wing portions after the fluid in the inside has been discharged, which can help reduce the contact area of the wing portions relative to the protective tube. In addition, the insertion of the balloon into the protective tube while holding the shape of the folded wing portions after the fluid in the inside has been discharged can also help suppress the wing portions from contacting other sites of the balloon, and the separation of the drug caused by the wing portions contacting the protective tube.

In the method of arranging the balloon, at the step of pleating the wing portions, the wing portions may be heated. Accordingly, it is possible to hold the shape of the wing portions in the state where the fluid in the inside of the balloon has been discharged.

In the method of arranging the balloon, at the step of folding the wing portions, the wing portions may be heated. Accordingly, it is possible to hold the wing portions after the fluid in the inside of the balloon has been discharged in the state of being folded to the shaft.

In the method of arranging the balloon, at the step of inserting the balloon into the protective tube, a flexible protective film may be disposed between the balloon and the protective tube. Accordingly, when the balloon is inserted into the protective tube, the drug on the outer surface of the balloon contacts the protective tube via the flexible protective film, which can help suppress the separation of the drug.

Moreover, in the method of arranging the balloon, at the step of pleating the wing portions, the wing distal end portion that is positioned on a protruding side, the wing proximal end portion that is connected to the base portion, and the wing middle portion that is positioned between the wing distal end portion and the wing proximal end portion, may be pleated on each of the wing portions, at the step of inserting the balloon into the protective tube, the wing distal end outer portion of the wing distal end portion that is directed to the side of the protective tube may be brought into contact with the inner peripheral surface of the protective tube, and the wing middle portion and the wing proximal end portion of the wing portion may be disposed to be separated from the inner peripheral surface of the protective tube. Accordingly, sites of the balloon other than the wing distal end outer portion come into no approximate contact with the protective tube, which can help suppress the separation of the drug caused by the balloon contacting the protective tube.

In the method of arranging the balloon, at the step of pleating the wing portions and the base portions, the flexible film may be interposed between the plurality of first blade portions arranged so as to surround the balloon in order to press the wing portions, and the balloon and at the step of bending the wing portions, the flexible film may be interposed between the plurality of second blade portions arranged so as to surround the balloon in order to bend the wing portions, and the balloon. Accordingly, when the wing portions and the base portions are pleated on the balloon, and when the wing portions are bent, it is possible to protect the surface of the balloon by the films, and help suppress the separation of the drug from the balloon.

In accordance with an aspect, a method is disclosed of arranging a balloon of a balloon catheter in which the balloon with an outer surface coated with a drug is disposed on an outer peripheral surface of a shaft so as to be inflatable, to an inside of a protective tube, the method comprising: injecting an inflation fluid into an inside of the balloon to obtain a pressure-applied state of the balloon; pleating a plurality of wing portions that protrude radially outward and a plurality of base portions that are in contact with the shaft while aspirating the inflation fluid from the inside of the balloon, wherein the plurality of wing portions that protrude radially outward and the plurality of base portions that are in contact with the shaft further comprises: positioning a wing distal end portion on a protruding side, connecting a wing proximal end portion to the base portion, and positioning a wing middle portion between the wing distal end portion and the wing proximal end portion in each of the plurality of wing portions during the pleating of the plurality of wing portions; and directing a wing distal end outer portion of the wing distal end portion to a side of the protective tube and bringing the wing distal end outer portion of the distal wing end portion into contact with an inner peripheral surface of the protective tube; folding the plurality of wing portions to a same direction in a circumferential direction of the shaft while holding a pressure-reduced state in the inside of the balloon; and inserting the balloon into the protective tube with the balloon in the pressure-reduced state in the inside of the balloon.

DETAILED DESCRIPTION

Set forth below with reference to the accompanying drawings is a detailed description of embodiments of a balloon catheter and a balloon arrangement method. Note that since embodiments described below are preferred specific examples of the present disclosure, although various technically preferable limitations are given, the scope of the present disclosure is not limited to the embodiments unless otherwise specified in the following descriptions. Note that, the dimensions on the drawings may be exaggerated for convenience of description, and may be different from the actual dimensions in some cases. Moreover, in the present specification and the drawings, the same reference signs are given to the components having substantially the same functions, and overlapped descriptions of the components are thus omitted. In the present specification, a side of a balloon catheter to be inserted into a blood vessel is referred to as a "distal side", and a hand-side at which the balloon catheter is operated is referred to as "proximal side".

A balloon catheter 10 according to an embodiment of the present disclosure is a device that is inserted into a lumen of a living body such as a blood vessel and is pressed to a stenosed lesion area, and expands the lesion area by a balloon 30 capable of inflating.

Figure 1:
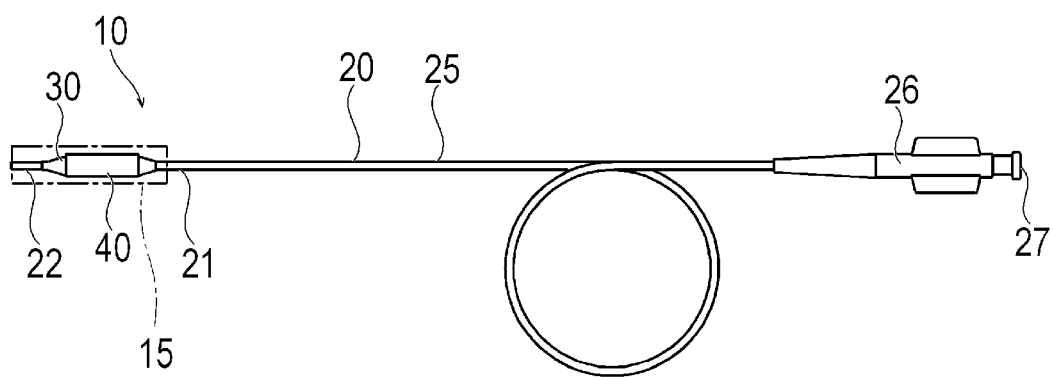
FIG. 1 is a front view illustrating a balloon catheter.
Figure 2:
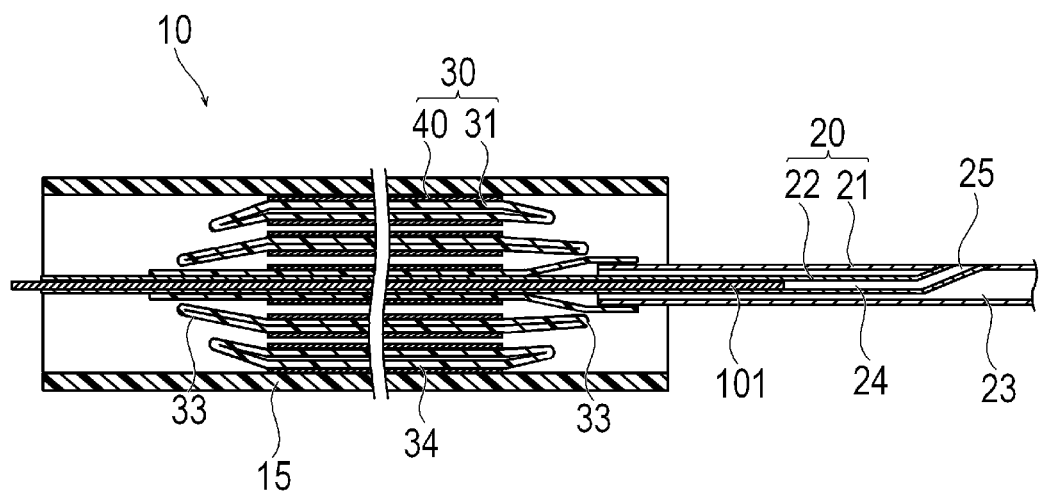
FIG. 2 is a cross-sectional view of a distal end portion of the balloon catheter.
Figure 3:
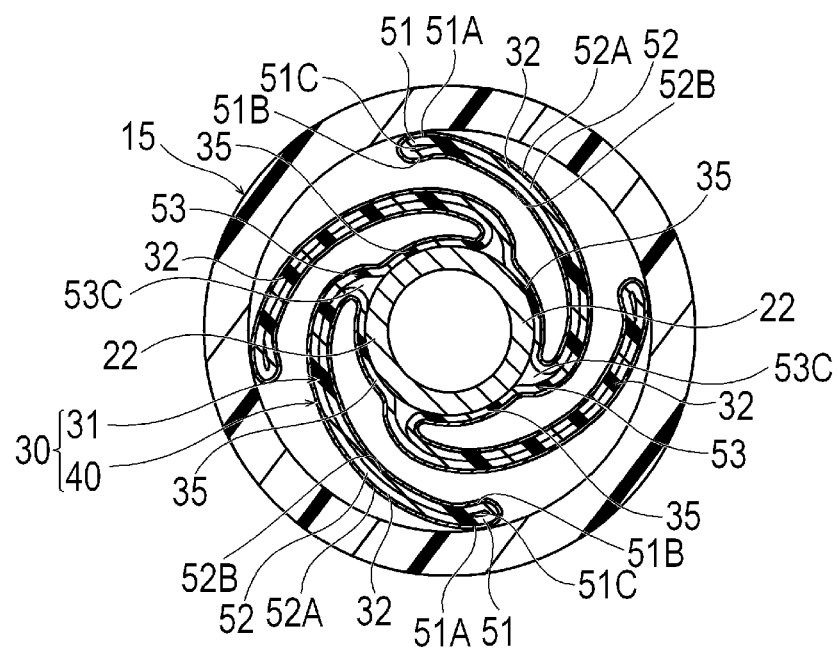
FIG. 3 is a cross-sectional view of the distal end portion of the balloon catheter orthogonal to a longitudinal axis of a balloon.

Firstly, a structure of the balloon catheter 10 will be described. The balloon catheter 10 includes, as illustrated in FIGS. 1 to 3, an elongated catheter main body 20, the balloon 30 that is provided to a distal portion of the catheter main body 20, a protective tube 15 that covers the balloon 30, and a hub 26 secured to a proximal portion of the catheter main body 20. The balloon 30 includes a balloon main body 31, and a drug-coated layer 40 with which an outer surface of the balloon main body 31 is coated. The balloon 30 with the drug-coated layer 40 is covered and protected by the protective tube 15 before use.

The catheter main body 20 is provided with an outer tube 21 that is a tubular body having a distal side end portion and a proximal side end portion. Both the distal side end portion and the proximal side end portion of the outer tube 21 are open. The catheter main body 20 also includes an inner tube 22 (shaft) that is a tubular body to be disposed in an inside of the outer tube 21. The inner tube 22 is contained in the hollow inside of the outer tube 21, and the catheter main body 20 has a double tube structure in the distal portion. The inner tube 22 includes a hollow inside, which is a guide wire lumen 24 through which a guide wire can be inserted. Moreover, an inflation lumen 23 in which an inflation fluid of the balloon 30 is circulated is formed in the hollow inside of the outer tube 21 and on an outer side of the inner tube 22. The inner tube 22 is opened to the outside in an opening portion 25 that penetrates a wall surface of the outer tube 21 in a side direction. The inner tube 22 protrudes further to the distal side than a distal end of the outer tube 21 (i.e., a distal end of the inner tube 22 is distal to the distal end of the outer tube 21).

The balloon 30 has a proximal side end portion that is fixed to a distal portion of the outer tube 21, and a distal side end portion that is fixed to a distal portion of the inner tube 22. Accordingly, the inside of the balloon 30 communicates with the inflation lumen 23. The inflation fluid is injected to the balloon 30 through the inflation lumen 23, whereby the balloon 30 can be caused to inflate. The inflation fluid may be gas or a liquid, and for example, the gas can be a helium gas, a $CO_2$ gas, or an $O_2$ gas, and the liquid can be saline (i.e., a saline solution) or a contrast agent.

In a center portion in a longitudinal direction of the balloon 30, a cylindrical straight portion 34 having an equal outer diameter when the balloon is caused to inflate is formed, and tapered portions 33 having an outer diameter that gradually changes are formed on both sides in a longitudinal direction of the straight portion 34. Further, an entire outer surface of the straight portion 34 is coated with the drug-coated layer 40 including the drug. Note that, a range in which the drug-coated layer 40 is formed in the balloon 30 is not limited only to the straight portion 34, but may include at least a part of the tapered portions 33, in addition to the straight portion 34, or may include only a part of the straight portion 34.

In the hub 26, a proximal opening portion 27 serving as a port that communicates with the inflation lumen 23 of the outer tube 21 and causes the inflation fluid to flow in and out is formed.

The length in the longitudinal direction of the balloon 30 is not specially limited, and can be, for example, preferably 5 mm to 500 mm, more preferably 10 mm to 300 mm, and further more preferably 20 mm to 200 mm.

The outer diameter of the balloon 30 when inflating is not specially limited, and can be, for example, preferably 1 mm to 10 mm, and more preferably 2 mm to 8 mm.

The material of the balloon main body 31 preferably has flexibility to some extent, and hardness to some extent such that the balloon main body 31 is caused to inflate when reaching a blood vessel, a tissue, or the like, and the drug can be released from the drug-coated layer 40 on the surface of the balloon main body 31. Specifically, the material of the balloon main body 31 can include resin and metal, and at least the outer surface of the balloon main body 31 on which the drug-coated layer 40 is provided preferably includes resin. As for the material for at least the outer surface of the balloon main body 31, for example, a polyolefin such as polyethylene, polypropylene, polybutene, an ethylene-propylene copolymer, an ethylene-vinyl acetate copolymer, an ionomer, or a mixture of two or more of the polyolefins, the ethylene-vinyl acetate copolymer, and/or the ionomer, soft polyvinyl chloride resin, thermoplastic resin such as polyamide, a polyamide elastomer, a nylon elastomer, polyester, a polyester elastomer, polyurethane, and fluorine resin, silicone rubber, latex rubber, and the like can be used. Among the materials for at least the outer surface of the balloon main body 31, polyamides can be preferred.

The drug-coated layer 40 contains a drug. The drug-coated layer 40 may contain an additive agent (excipient). The drug of the drug-coated layer 40 may be a crystalline type, an amorphous type, or a mixture of the crystalline type and the amorphous type. In a case where the drug is a crystalline type, for example, homogeneous (white) crystals are formed on the entire circumference of the balloon 30 (substantially contain no amorphousness).

The drug may be a water-soluble drug, but is preferably a water-insoluble drug. The water-insoluble drug indicates a drug that is insoluble or poorly-soluble in water, and specifically, the solubility in water is less than 1 mg/mL at pH5 to 8. The solubility may be less than 0.1 mg/mL. The water-insoluble drug can include a fat-soluble drug.

Examples of some preferred water-insoluble drugs include immunosuppressive agents, such as cyclosporins including cyclosporine, immunoactive agents such as rapamycin, anticancer agents such as paclitaxel, antiviral agents or antimicrobial agents, antineoplastic agents, analgesic agents and anti-inflammatory agents, antibiotics, antiepileptics, anxiolytics, anticonvulsant agents, antagonists, neuron blocking agents, anticholinergics and cholinergic agents, antimuscarinic and muscarinic agents, antiadrenergic agents, antiarrhythmic agents, antihypertensive agents, hormonal agents, and nutritional agents.

The water-insoluble drug is preferably at least one selected from the group consisting of rapamycin, paclitaxel, docetaxel, and everolimus. In the present specification, rapamycin, paclitaxel, docetaxel, and everolimus each include analogs and/or derivatives of rapamycin, paclitaxel, docetaxel, and everolimus as long as they have similar medicinal properties. For example, paclitaxel and docetaxel are in an analog relationship. Rapamycin and everolimus are in a derivative relationship. Among the water-insoluble drugs, paclitaxel is preferable.

The additive agent is not specially limited, and can include, for example, a water-soluble low molecular weight compound. The molecule amount of the water-soluble low molecular weight compound can be, for example, 50 to 2000, preferably 50 to 1000, more preferably 50 to 500, and further more preferably 50 to 200. The water-soluble low molecular weight compound can be, for example, relative to 100 parts by mass of the water-insoluble drug, preferably 10 parts by mass to 5000 parts by mass, more preferably 50 parts by mass to 3000 parts by mass, and further more preferably 100 parts by mass to 1000 parts by mass. The material for the water-soluble low molecular weight compound can be, for example, serine ethyl ester, saccharide such as glucose, sugar alcohol such as sorbitol, a citric acid ester, polysorbate, polyethylene glycol, urea, a water-soluble polymer, a contrast agent, an amino acid ester, a glycerol ester of a short chain monocarboxylic acid, a salt and a surface-active agent allowable as a pharmaceutical preparation, and the like, a mixture of two or more of the materials for the water-soluble low molecular weight compound, or the like.

A method in which the balloon main body 31 is coated with the drug-coated layer 40 is not specially limited. For example, the balloon main body 31 may be caused to move in the longitudinal direction while being caused to rotate about an axial center of balloon main body 31, and a coating liquid including a drug, an additive agent, and a solvent may be applied to the surface of the balloon so as to draw a spiral on an outer surface of the balloon 30. Evaporation of a solvent in the coating liquid applied on the surface of the balloon forms the drug-coated layer 40. Alternatively, the drug-coated layer 40 may be formed by dipping the balloon main body 31 into the coating liquid, or spraying the coating liquid on the balloon main body 31.

The protective tube 15 is a member that covers and protects the balloon 30, and helps suppress separation of the drug from the balloon 30. The protective tube 15 is removed before the balloon catheter 10 is used. The protective tube 15 can include a flexible material, and for example, a polyolefin such as polyethylene, polypropylene, polybutene, an ethylene-propylene copolymer, an ethylene-vinyl acetate copolymer, an ionomer, or a mixture of two or more of flexible materials of the protective tube 15, soft polyvinyl chloride resin, thermoplastic resin such as polyamide, a polyamide elastomer, polyester, a polyester elastomer, polyurethane, and fluorine resin, silicone rubber, latex rubber, and the like can be used.

In the balloon 30, as illustrated in FIG. 3, by a balloon folding device 100, which is described later, a plurality of wing portions 32 of the balloon 30 that protrude radially outward of the balloon are pleated and folded. The wing portions 32 are pleats, and long and narrow folds that are formed in a relatively thin material of the balloon 30. The plurality of wing portions 32 are approximately evenly pleated in a circumferential direction of the balloon 30. The respective wing portions 32 are disposed in an inside of the protective tube 15 in a state of being folded in the same direction in the circumferential direction of the balloon 30 so as to be wound around the inner tube 22. In the exemplary example illustrated in FIG. 3, the four wing portions 32 are pleated.

The balloon 30 includes the plurality of wing portions 32, and a plurality of base portions 35 each positioned between the adjacent wing portions 32. Each of the base portions 35 contacts an outer peripheral surface of the inner tube 22. The wing portions 32 and the base portions 35 are alternately arranged along a circumferential direction of the inner tube 22. The wing portions 32 are pleated by folds extending in a substantial longitudinal direction of the balloon 30. The length in the longitudinal direction of the wing portions 32 does not exceed the length of the balloon 30. The length in a direction in which the wing portions 32 protrude radially outward from the catheter main body 20 is not specially limited, and can be, for example, approximately 1 mm to 8 mm. The number of the wing portions 32 is not specially limited, and can be, for example, about 2 wing sheets to 7 wing sheets. When the balloon 30 inflates, the base portions 35 separate from the inner tube 22, and inner surfaces of the balloon 30 that are in contact with or facing each other in the wing portions 32 separate from each other, so that the balloon 30 can become an approximate cylindrical shape (see FIG. 9). The inner surface of the balloon 30 is a surface that is positioned at a side of an internal space into which a fluid of the balloon 30 flows.

The wing portions 32 each include a wing distal end portion 51 that is positioned on a protruding side, a wing proximal end portion 53 that is near the inner tube 22, and a wing middle portion 52 that is positioned between the wing distal end portion 51 and the wing proximal end portion 53.

Each of the wing distal end portions 51 includes a wing distal end outer portion 51A that is directed to the side of the protective tube 15, and a wing distal end inner portion 51B that is directed to a side of the inner tube 22. In an inner side of the wing distal end portion 51, a minute distal end space portion 51C is defined by the inner surfaces of the balloon 30. In accordance with an embodiment, no distal end space portion 51C may be formed. At least a part of the wing distal end outer portion 51A contacts an inner peripheral surface of the protective tube 15. All (four in the present embodiment) of the wing distal end outer portions 51A preferably contact the inner peripheral surface of the protective tube 15, but the embodiment is not limited to each of the wing distal end outer portions 51A being, for example, in contact the inner peripheral surface of the protective tube 15. The wing distal end inner portion 51B does not contact the adjacent another wing portion 32 and the base portion 35, and the wing distal end inner portion 51B is separated from the adjacent wing portion 32 and the base portion 35. In accordance with an embodiment, a minute portion (or range) in the wing distal end inner portion 51B may contact another wing portion 32 or the base portion 35.

Each of the wing middle portions 52 includes a wing middle outer portion 52A that is directed to the side of the protective tube 15, and a wing middle inner portion 52B that is directed to the side of the inner tube 22. The inner surfaces of the balloon 30 contact each other to pleat the wing middle portion 52 to be relatively thin. In the wing middle portion 52, the inner surfaces of the balloon 30 may be separated from (in no contact with) each other with a minute range (i.e., relatively small distance) between one inner surface and the other adjacent inner surface of the balloon 52. The wing middle outer portion 52A is separated from (in no contact with) the inner peripheral surface of the protective tube 15 and another wing portion 32. In accordance with an exemplary embodiment, a minute range of the wing middle outer portion 52A may contact the inner peripheral surface of the protective tube 15 or another wing portion 32. The wing middle inner portion 52B is separated from (in no contact with) the adjacent another wing portion 32 and the base portion 35. In accordance with an embodiment, a minute range of the wing middle inner portion 52B may contact the adjacent another wing portion 32 or the base portion 35.

The wing proximal end portion 53, which is pleated such that the inner surfaces of the balloon 30 are separated from each other, is positioned between the base portion 35 and the wing middle portion 52. In an inside of the wing proximal end portion 53, a minute proximal end space portion 53C is defined by the inner surfaces of the balloon 30 and the outer peripheral surface of the inner tube 22. The wing proximal end portion 53 is separated from (in no contact with) the adjacent another wing portion 32. In accordance with an embodiment, a minute range of the wing proximal end portion 53 may contact the adjacent another wing portion 32.

Each of the wing portions 32 comes into no approximate contact with other sites of the balloon 30, and each of the wing portions 32, excluding the wing distal end outer portion 51A, does not generally contact the inner peripheral surface of the inner tube 22. Moreover, each of the base portions 35 comes into no approximate contact with other sites of the balloon 30. Therefore, the drug-coated layer 40 provided on the wing portions 32 is just barely in contact with other sites, excluding the wing distal end outer portion 51A. Therefore, the separation of the drug from the balloon 30 can be, for example, suppressed. Moreover, the balloon 30 contacts the inner peripheral surface of the protective tube 15 at the respective wing distal end outer portions 51A that are approximately uniformly arranged in the circumferential direction. Therefore, the protective tube 15 can be, for example, held by the balloon 30 even if the protective tube 15 has a small area in contact with the drug-coated layer 40 of the balloon 30.

In a cross section orthogonal to a longitudinal axis of the inner tube 22, in the size (total length in the cross section) in a total range of the wing distal end inner portion 51B and the wing middle inner portion 52B of each of the wing portions 32, the size (length in the cross section) in contact with other sites of the balloon 30 is not specially limited, but can be, for example, preferably 50% or less, more preferably 30% or less, further more preferably 10% or less, further more preferably 5% or less, further more preferably 3% or less, further more preferably 1% or less, and further more preferably 0%. As the range in which the side of each of the wing portions 32 directed to the inner tube 22 is in contact with other sites of the balloon 30 is smaller, an effect of suppressing the separation of the drug due to the contact can be improved.

In the cross section orthogonal to the longitudinal axis of the inner tube 22, an area between an outer surface of the balloon 30 and the inner peripheral surface of the protective tube 15 is not specially limited, but can be, for example, preferably 50% or more of an area between the inner peripheral surface of the protective tube 15 and the outer peripheral surface of the inner tube 22, more preferably 60% or more, further more preferably 70% or more, and further more preferably 80% or more. As the ratio of the area between the outer surface of the balloon 30 and the inner peripheral surface of the protective tube 15 is higher, the outer surface of the balloon 30 is difficult to contact the other sites, an effect of suppressing the separation of the drug due to the contact can be improved.

Next, a balloon folding device 100 will be described. The balloon folding device 100 is a device that can fold the balloon 30 so as to be wound around the inner tube 22.

Figure 4:
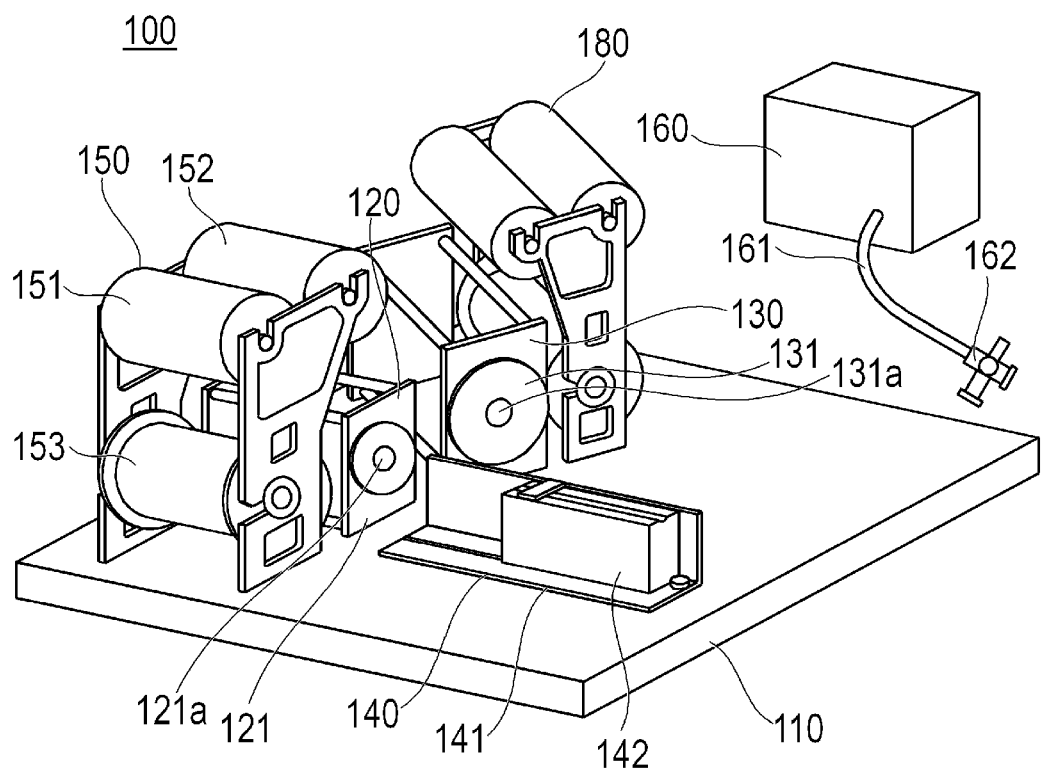
FIG. 4 is a perspective view illustrating a balloon folding device.

The balloon folding device 100 can include, as illustrated in FIG. 4, a base 110, a pleating section 120, a folding section 130, a support mount 140, and a pressure applying/reducing device 160. The pleating section 120, the folding section 130, and the support mount 140 are disposed on the base 110 formed in a base shape (i.e., relatively flat surface).

Figure 10:
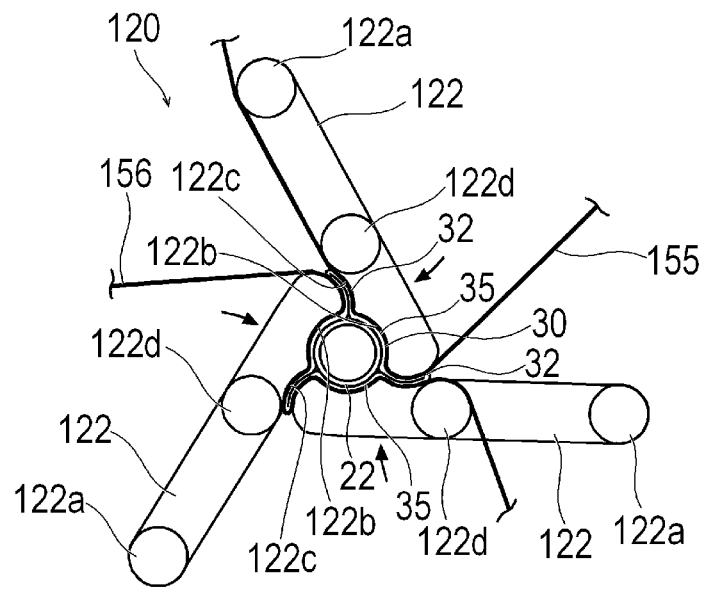
FIG. 10 is a cross-sectional view illustrating a state where wing portions are pleated on the balloon by the pleating section.
Figure 11:
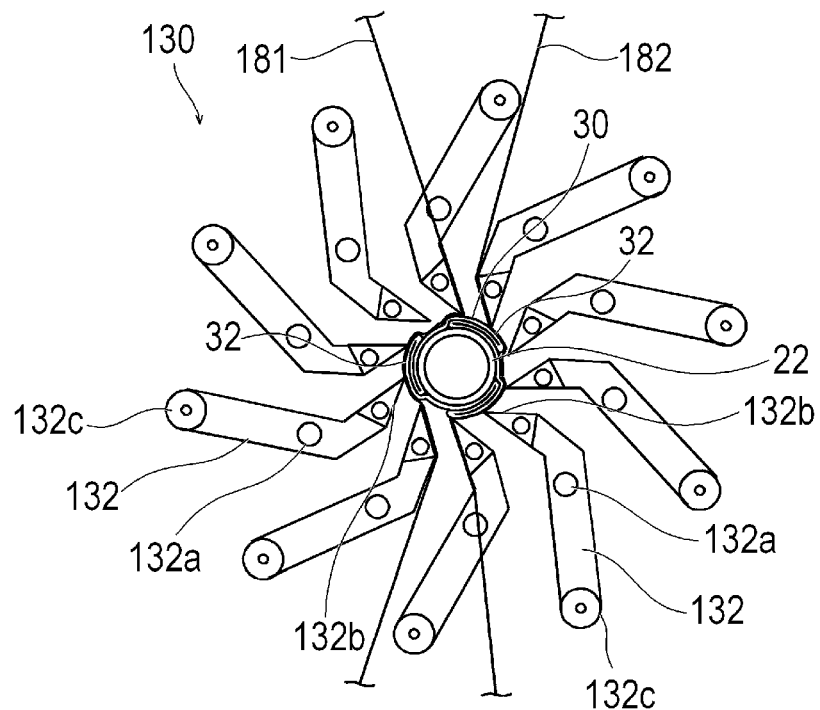
FIG. 11 is a cross-sectional view illustrating a state where wing portions are folded by the folding section.

The pleating section 120 can pleat the wing portions 32 that protrude in the radial direction of the balloon 30, as illustrated in FIG. 10. The folding section 130 can lay and fold the wing portions 32 pleated on the balloon 30, in a circumferential direction, as illustrated in FIG. 11. The support mount 140 can hold the balloon catheter 10 while the wing portions 32 are pleated on the balloon 30 and folded, as illustrated in FIG. 3. The pressure applying/reducing device 160 can supply a fluid to the inside of the balloon 30 to apply pressure, and can aspirate the fluid from the inside of the balloon 30 to reduce pressure.

A film supply section 150 that supplies a first film 155 and a second film 156 to the pleating section 120 is disposed adjacent to the pleating section 120, on the base 110. Moreover, a film supply section 180 that supplies a first film 181 and a second film 182 to the folding section 130 is disposed adjacent to the folding section 130, on the base 110.

The pleating section 120 includes a front surface plate 121 perpendicular to the base 110, and the front surface plate 121 includes an insertion hole 121a through which a distal portion of the balloon catheter 10 can be inserted. Moreover, the folding section 130 includes a front surface plate 131 perpendicular to the base 110, the front surface plate 131 includes an insertion hole 131a through which the distal portion of the balloon catheter 10 can be inserted. The front surface plate 131 of the folding section 130 faces toward a direction different from a direction toward which the front surface plate 121 of the pleating section 120 faces.

The support mount 140 is rotatable so as to face toward both of a position facing the pleating section 120 and a position facing the folding section 130. The support mount 140 includes a base portion 141 that can be rotatably mounted on the base 110, and a holding stand 142 that is horizontally movable on the base portion 141. The holding stand 142 can hold the balloon catheter 10 on an upper surface of the holding stand 142. The holding stand 142 moves by sliding on an upper surface of the base portion 141, and the holding stand 142 can move forward or backward toward the pleating section 120 or the folding section 130. The holding stand 142 holding the balloon catheter 10 moves forward or backward toward the pleating section 120, whereby the balloon 30 is inserted into or pulled out from the insertion hole 121a of the pleating section 120. Moreover, the holding stand 142 holding the balloon catheter 10 moves forward or backward toward the folding section 130, whereby the balloon 30 is inserted into or pulled out from the insertion hole 131a of the folding section 130.

The pressure applying/reducing device 160 can be, for example, a pump. The pressure applying/reducing device 160 may be, for example, a syringe, or an indeflator (i.e., an inflation/deflation device). The pressure applying/reducing device 160 includes a pressure applying/reducing tube 161 that can be coupled to the proximal opening portion 27 of the balloon catheter 10. The pressure applying/reducing tube 161 supplies a fluid to the proximal opening portion 27, and aspirates the fluid from the proximal opening portion 27. The pressure applying/reducing tube 161 may be provided with a stopcock 162 that can be manually operated to open and close. The stopcock 162 can be, for example, a three-way stopcock.

Figure 5:
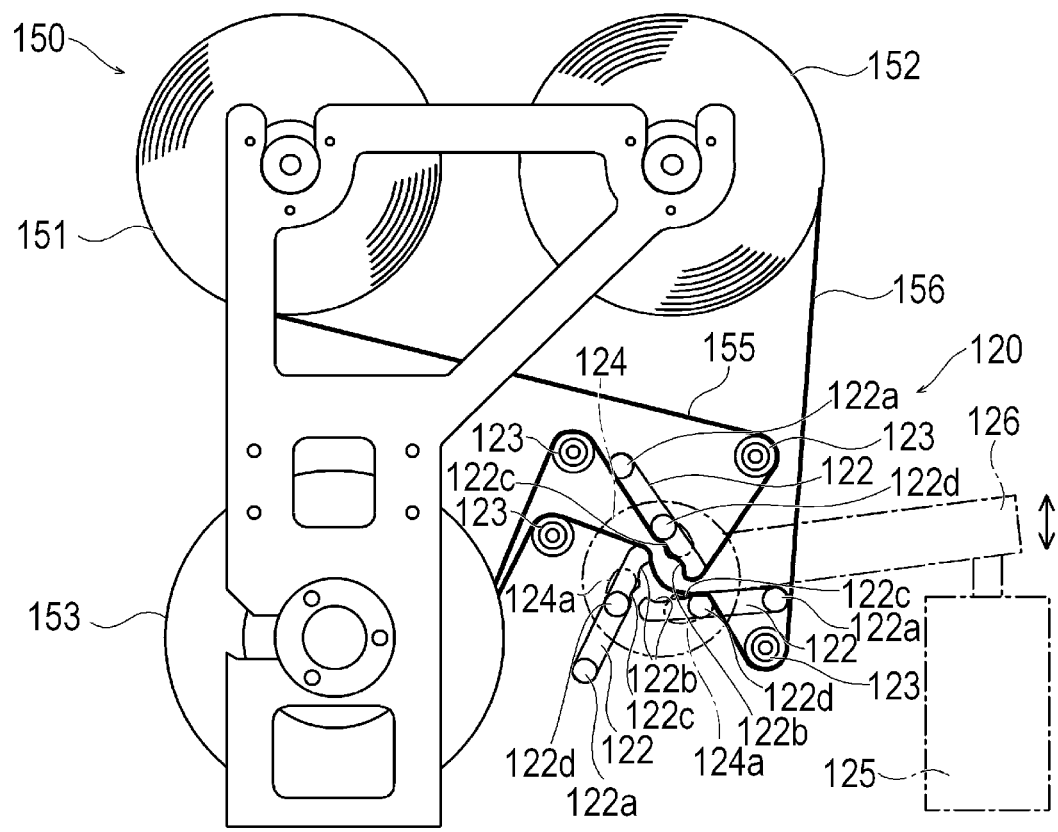
FIG. 5 is a front view illustrating a pleating section.
Figure 6:
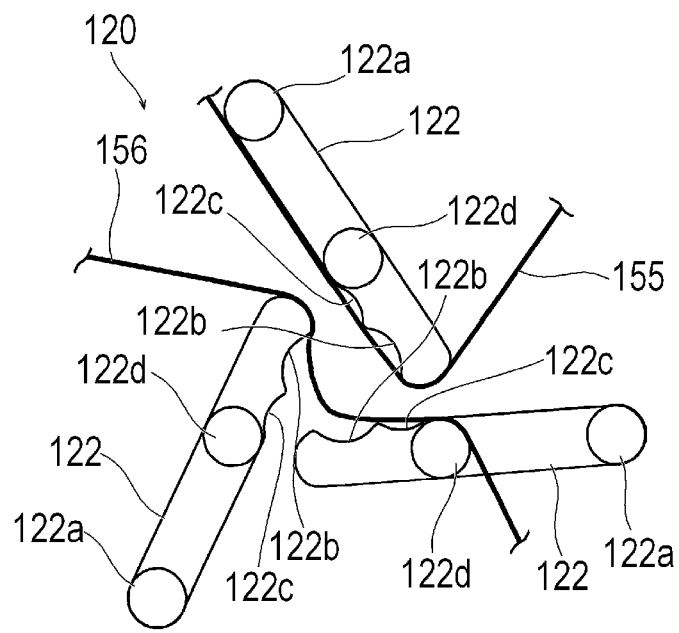
FIG. 6 is a front view illustrating first blade portions in the pleating section.

Next, the structure of the pleating section 120 will be described in details. The pleating section 120 includes a plurality of first blade portions 122 in an inside of the pleating section 120, as illustrated in FIGS. 5 and 6. The number of the first blade portions 122 is identical with the number of the wing portions 32 to be pleated on the balloon 30. Herein, for example, a case where the three first blade portions 122 are provided will be described. Each of the first blade portions 122 is a plate-like member having a cross-sectional shape to be pleated in the same shape at each position along the longitudinal direction of the balloon catheter 10 to be inserted. The first blade portions 122 are disposed so as to each form an angle of 120 degrees relative to the center of a center region in which the balloon 30 is inserted, and surround the center region. In other words, the respective first blade portions 122 are disposed at an equal angle in the circumferential direction. The first blade portion 122 includes a rotational-movement center portion 122a in the vicinity of an outer circumference end portion, and can move rotationally about the rotational-movement center portion 122a. Moreover, the first blade portion 122 includes a motion pin 122d extending in the longitudinal direction on an inner circumference side from the rotational-movement center portion 122a. The motion pin 122d is fitted into a fitting groove 124a that is formed in a rotation member 124 rotatable in the pleating section 120. The rotation member 124 is coupled to a beam portion 126 extending in a substantially horizontal direction. The rotation member 124 is rotatable by receiving a rotation force from the beam portion 126 that inclines by receiving a force from a drive source 125 such as, for example, a hydraulic cylinder or a motor. When the rotation member 124 rotates, the motion pin 122d that is fitted into the fitting groove 124a moves in the circumferential direction to move rotationally each of the first blade portions 122 about the rotational-movement center portion 122a. The three first blade portions 122 move rotationally to allow the center region surrounded by the first blade portions 122 to be narrowed. The number of the first blade portions 122 is not specially limited as long as the number of blade portions 112 is two or more.

The first blade portion 122 includes a first shape pleating portion 122b and a second shape pleating portion 122c, which are substantially arcuate, in an inner circumference end portion on the opposite side of the rotational-movement center portion 122a. The first shape pleating portions 122b contact the surface of the balloon 30 to be inserted into the pleating section 120 with the rotational-movement of the first blade portions 122 to allow the wing portions 32 protruding in the radial direction to be pleated on the balloon 30. The second shape pleating portion 122c can curve the wing portions 32 in a predetermined direction by contacting the wing portions to be pleated on the balloon 30 with the rotational-movement of the first blade portion 122. Moreover, the pleating section 120 can include a heater for heating the first blade portions 122. The pleating section 120 does not need to include the heater for heating the first blade portions 122. The length of the first blade portion 122 along the longitudinal direction of the balloon catheter 10 is longer than the length of the balloon 30. Moreover, the length of the first shape pleating portion 122b and the second shape pleating portion 122c of the first blade portion 122 may extend over or does not need to extend over a total length of the first blade portion 122.

The first film 155 and the second film 156, which can be made of resin, are supplied to the first blade portions 122 from the film supply section 150. A plurality of rotation axis portions 123 are provided in the pleating section 120 in order to guide the respective films. The first film 155 spreads on the surface of the first blade portion 122 disposed in an upper part, from a first film holding portion 151 via the rotation axis portion 123. Moreover, the first film 155 reaches from the first blade portion 122 through the rotation axis portion 123, to a film take-up portion 153 that is rotationally driven by a drive source, for example, a motor. The second film 156 spreads on the two first blade portions 122 disposed in a lower part from a second film holding portion 152 via the rotation axis portion 123. Moreover, the second film 156 reaches to the film take-up portion 153 through the rotation axis portion 123. With these configurations, a center position of the pleating section 120 through which the balloon 30 is inserted is in a state of being surrounded by the first film 155 and the second film 156. The films are respectively supplied from the first film holding portion 151 and the second film holding portion 152, and the two films are collected by being overlapped in the film take-up portion 153.

The first film 155 and the second film 156 protect the balloon 30 so as not to come into direct contact with the surfaces of the first blade portions 122 when the balloon 30 is inserted into the pleating section 120, and the first blade portions 122 rotate to pleat the wing portions 32 on the balloon 30. After the wing portions 32 of the balloon 30 have been pleated, the first film 155 and the second film 156 are wound up on the film take-up portion 153 by a predetermined length. In other words, portions in the first film 155 and the second film 156 having contact the balloon 30 once do not contact the balloon 30 again, but new portions are supplied to the center position of the pleating section 120 every time the balloon 30 is inserted.

As illustrated in FIG. 5, in a state before the insertion of the balloon 30, the first shape pleating portions 122b and the second shape pleating portions 122c of the three first blade portions 122 are in a state of being separated from one another. The region that is surrounded by the plurality of the first blade portions 122 is surrounded by the first shape pleating portions 122b having the substantially arcuate shape, and the inflated balloon 30 can be inserted through the region surrounded by the plurality of first blade portions 122.

Figure 7:
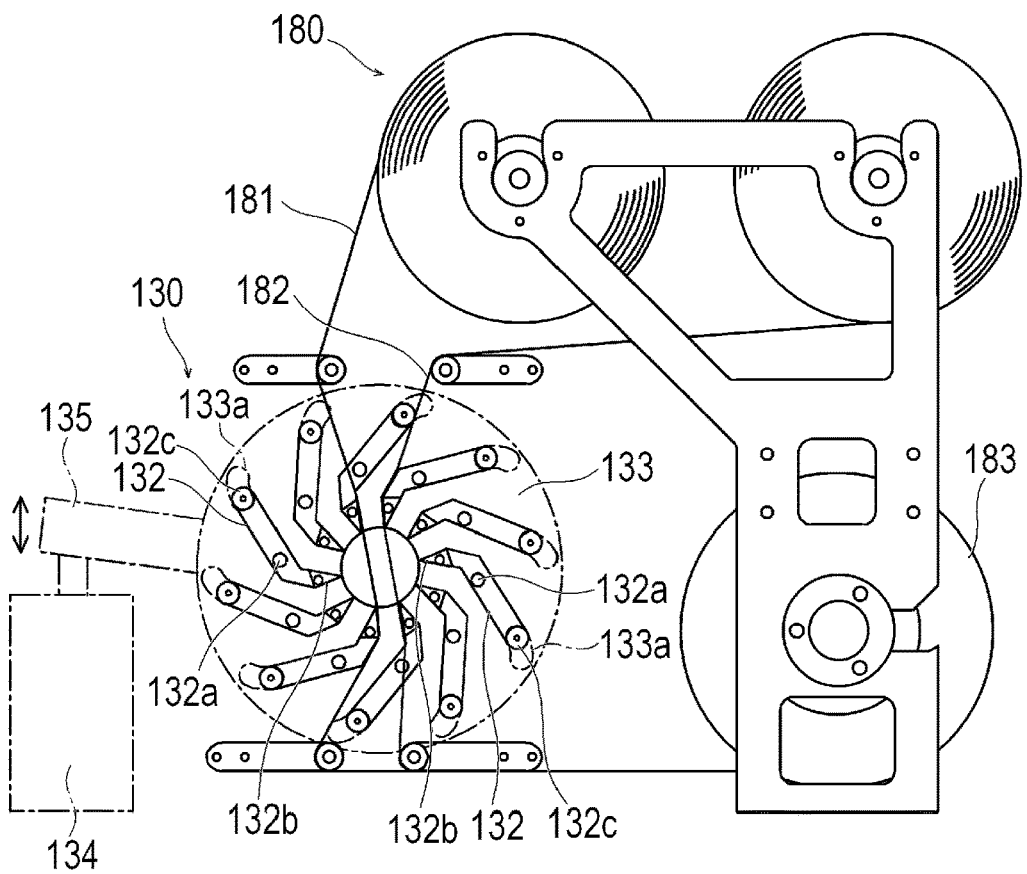
FIG. 7 is a front view illustrating a folding section.
Figure 8:
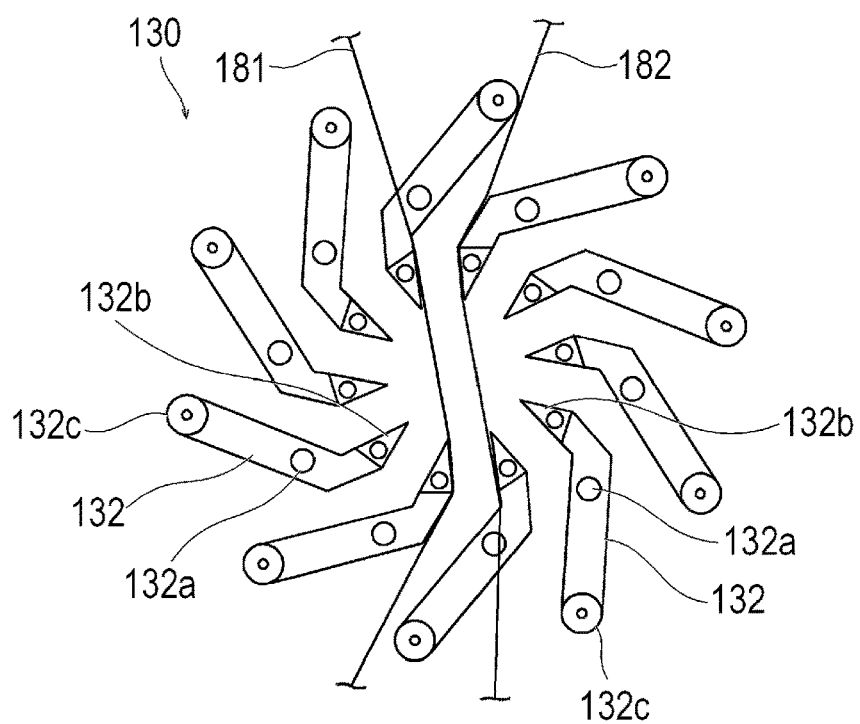
FIG. 8 is a front view illustrating second blade portions in the folding section.

Next, the structure of the folding section 130 will be described in details. In accordance with an exemplary embodiment, the folding section 130 can include ten second blade portions 132 in an inside of the folding section 130, as illustrated in FIGS. 7 and 8. Each of the second blade portions 132 can be a plate-like member having a cross-sectional shape to be pleated in the same shape at each position along the longitudinal direction of the balloon catheter 10 to be inserted. The second blade portions 132 are disposed so as to form each angle of 36 degrees relative to the center position at which the balloon is inserted. In other words, the respective second blade portions 132 are disposed at an equal angle in the circumferential direction. The second blade portion 132 includes a rotational-movement center portion 132a in the vicinity of an approximately center, and can move rotationally about the rotational-movement center portion 132a. Moreover, each second blade portion 132 includes a motion pin 132c extending in the axis direction in the vicinity of a substantially outer circumference end portion. The motion pin 132c is fitted into a fitting groove 133a that is formed in a rotation member 133 rotatable in the folding section 130. The rotation member 133 is coupled to a beam 135 extending in the substantially horizontal direction. The rotation member 133 is rotatable by receiving a rotation force from the beam 135 that inclines by receiving a force from a drive source 134 such as a hydraulic cylinder or a motor. When the rotation member 133 rotates, the motion pin 132c that is fitted into the fitting groove 133a moves in the circumferential direction to move rotationally each of the second blade portions 132 about the rotational-movement center portion 132a. The ten second blade portions 132 move rotationally to allow a space region in the center portion surrounded by the second blade portions 132 can be narrowed. The number of the second blade portions 132 is not limited, for example, to ten.

The second blade portion 132 is bent at a distal end side, and a distal end portion 132b has a pointed shape. The distal end portions 132b, which contact the surface of the balloon 30 to be inserted into the folding section 130 with the rotational-movement of the second blade portions 132, can fold the wing portions 32 pleated on the balloon 30 in the circumferential direction. In this process, the wing portions 32 can be folded so as to be laid relative to the inner tube 22 (shaft), or can also be folded in a state of the wing portions 32 being floated from the inner tube 22 (non-contact state). Moreover, the folding section 130 can include a heater for heating the second blade portions 132. The folding section 130 does not need to include the heater for heating the second blade portions 132.

The first film 181 and the second film 182, which can be made of resin, are supplied to the second blade portions 132 from the film supply section 180. The supply structure of each film is similar to the case of the pleating section 120. The first film 181 and the second film 182 are disposed to face each other so as to sandwich the center space region surrounded by the second blade portions 132. The first film 181 and the second film 182 can prevent the balloon 30 inserted into the folding section 130 from coming into direct contact with the surfaces of the second blade portions 132. The first film 181 and the second film 182 reach through the second blade portions 132 to a film take-up portion 183 that is rotationally driven by a drive source such as a motor.

As illustrated in FIG. 8, in a state before the insertion of the balloon 30, the distal end portions 132b of the respective second blade portions 132 are each in a separated state in the circumferential direction. The balloon 30 with the wing portions 32 pleated on the balloon 30 can be inserted between the first film 181 and the second film 182, which is a center region surrounded by the second blade portions 132.

Next, a method of folding and disposing the balloon 30 to the protective tube 15 using the balloon folding device 100 will be described.

Firstly, as illustrated in FIG. 4, in order to pleat the wing portions 32 on the balloon 30, the catheter main body 20 is mounted on the holding stand 142 of the support mount 140. A core 101 (see FIG. 2) is inserted into the guide wire lumen 24. A distal end of the core 101 is positioned distal to a distal end of the balloon 30. A proximal end of the core 101 may be positioned in the inside of the balloon 30, may be positioned distal to the opening portion 25 of the guide wire lumen 24 at the proximal side, or may be positioned proximal to the opening portion 25 of the guide wire lumen 24 at the proximal side. When the distal end of the core 101 is positioned distal to the distal end of the balloon 30, the length of the core 101 may be shorter than the length of the first blade portion 122 and the length of the second blade portion 132. The core 101 may have a length in the longitudinal direction overlapping with the whole of the first blade portions 122 and the whole of the second blade portions 132. Moreover, the first blade portions 122 and the second blade portions 132 do not need to overlap with the opening portion 25 of the guide wire lumen 24 at the proximal side, in the longitudinal direction. Note that, the core 101 does not need to be inserted. The pressure applying/reducing tube 161 of the pressure applying/reducing device 160 is coupled to the proximal opening portion 27 of the balloon catheter 10. The balloon 30 is in a state of inflating by the own shape in a natural state where pressure is neither applied no reduced by the pressure applying/reducing device 160.

Figure 9:
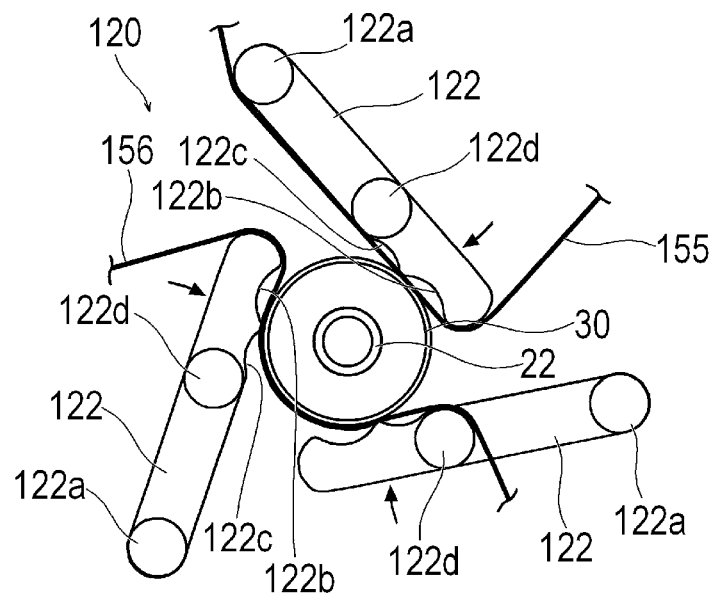
FIG. 9 is a cross-sectional view illustrating a state where the balloon is inserted into the pleating section.

Next, the holding stand 142 is moved by sliding on the base portion 141 to insert the balloon catheter 10 from the insertion hole 121a into the pleating section 120. The first blade portions 122 of the pleating section 120 is preferably heated, but do not need to be heated. As illustrated in FIG. 9, the balloon 30 is disposed in the center region surrounded by the plurality of first blade portions 122.

Next, the pressure applying/reducing device 160 is adjusted to further rotate the rotation member 124 (see FIG. 5) by the drive source 125 while gradually aspirating and discharging the fluid from the balloon 30. Accordingly, as illustrated in FIG. 10, the first blade portions 122 move rotationally. Therefore, the first shape pleating portions 122b of the first blade portions 122 move closer to one another to narrow the center region among the first blade portions 122 to the extent of the outer diameter of the inner tube 22. Accordingly, the balloon 30 inserted into the center region among the first blade portions 122 is pressed against the inner tube 22 by the first shape pleating portion 122b to pleat the base portions 35. A portion of the balloon 30 that is not pressed by the first shape pleating portion 122b is pushed out into a gap between a distal end portion of the first blade portion 122 and the second shape pleating portion 122c of the first blade portion 122 adjacent to the relevant first blade portion 122 to pleat the wing portion 32 curved in one direction. The first blade portions 122 can heat the balloon 30 to approximately 50 degrees Celsius to 60 degrees Celsius. Therefore, the pleated wing portions 32 can maintain the shape without any change. In this manner, the plurality of wing portions 32 and base portions 35 are pleated on the balloon 30. The balloon 30 does not need to be heated. The pressure reduction by the pressure applying/reducing device 160 and the pressure application due to pressing by the first blade portions 122 act on the inside of the balloon 30. The pressure reduction by the pressure applying/reducing device 160 and the pressure application by the first blade portions 122 to be driven by the drive source 125 are adjusted such that the internal pressure in the balloon 30 is maintained to the extent slightly higher than the atmospheric pressure, which can help prevent the balloon 30 from rapidly deflating by the pressure applying/reducing device 160, before the balloon 30 is pressed by the first blade portions 122 to pleat the wing portions 32 on the balloon 30. Accordingly, the balloon 30 is appropriately pressed by the first blade portions 122 to pleat the wing portions 32. Note that, when the wing portions 32 are pleated on the balloon 30, the proximal opening portion 27 may be opened to the atmosphere instead of the aspiration by the pressure applying/reducing device 160. The proximal opening portion 27 can be rather easily opened by the stopcock 162, which can be, for example, a three-way stopcock. After the process of pleating the wing portions 32 on the balloon 30 has been completed, the state where the pressure in the inside of the balloon 30 is reduced is maintained. For that purpose, the pressure reduction may be continued by the pressure applying/reducing device 160, or the stopcock 162 may be closed. The fluid in the inside of the balloon 30 are almost discharged in the process of pleating the wing portions 32.

At the process of pleating the wing portions 32, a surface of each first blade portion 122 to contact the balloon 30 is covered by the first film 155 and the second film 156. Therefore, the balloon 30 does not come into direct contact with the surfaces of the first blade portions 122. After the wing portions 32 have been pleated on the balloon 30, the first blade portions 122 are moved rotationally so as to return to the original positions. Thereafter, the balloon 30 is pulled out from the pleating section 120.

Next, as illustrated in FIG. 4, the holding stand 142 is moved on the upper surface of the base portion 141 to be separated from the pleating section 120, and to pull out the balloon catheter 10 from the pleating section 120. Next, the support mount 140 is moved by sliding on an upper surface of the base 110 to position the support mount 140 to a position facing the front surface plate 131 of the folding section 130. Thereafter, the holding stand 142 is moved on the upper surface of the base portion 141 to insert the balloon catheter 10 from the insertion hole 131*a* into the folding section 130 while maintaining the pressure-reduced state in the inside of the balloon 30. The second blade portions 132 of the folding section 130 are already heated to about 50 degrees Celsius to 60 degrees Celsius. Note that, the second blade portions 132 do not need to be heated.

After the balloon 30 with the wing portions 32 pleated on the balloon 30 has been inserted into the folding section 130, as illustrated in FIG. 7, the drive source 134 is operated to rotate the rotation member 133. Accordingly, as illustrated in FIG. 11, the second blade portions 132 move rotationally, and the distal end portions 132*b* of the respective second blade portions 132 move closer to one another. Therefore, the center region among the second blade portions 132 is narrowed. Accordingly, the balloon 30 inserted into the center region among the second blade portions 132 is in a state in which the wing portions 32 are laid in the circumferential direction by the distal end portions 132*b* of the respective second blade portions 132. The wing portions 32 are folded while the pressure-reduced state in the inside of the balloon 30 is maintained. All of the wing portions 32 are bent in one direction (in a clockwise direction or in a counter-clockwise direction). The wing portion 32 bent in one direction is maintained in the bent state so as not to contact the adjacent wing portion 32. The second blade portions 132 are heated in advance before the insertion of the balloon 30, and the balloon 30 is heated by the second blade portions 132, so that the wing portions 32 laid in the circumferential direction by the second blade portions 132 can maintain the shape without any change. In this case, a surface of each second blade portion 132 to contact the balloon 30 is covered by the first film 181 and the second film 182. Therefore, the balloon 30 does not come into direct contact with the surfaces of the second blade portions 132.

After the wing portions 32 of the balloon 30 have been folded, the second blade portions 132 are moved rotationally so as to return to the original positions. The wing portions 32 may be raised to some extent from the state in which the wing portions 32 are folded by being pressed by the second blade portions 132. Next, the balloon 30 is pulled out from the folding section 130 while the pressure-reduced state in the inside of the balloon 30 is maintained. Next, the balloon catheter 10 is removed from the support mount 140, and the balloon 30 is inserted into the tubular protective tube 15 while the pressure-reduced state in the inside of the balloon 30 is maintained, as illustrated in FIGS. 2 and 3. The wing portions 32 is held inside the protective tube 15 in a bent state in which the folds are returned after the wing portions 32 have been folded once. In accordance with an aspect, each of the wing portions 32 form one arc. This completes the folding of the balloon 30 and the disposing of the balloon 30 to the protective tube 15. The wing portions 32 and the base portions 35 in a state in which the fluid in the inside are almost discharged are pleated on the balloon 30, which is inserted into the protective tube 15. The wing portions 32 are urged inside the protective tube 15. Accordingly, when the protective tube 15 is removed from the wing portions 32, the shapes of the wing portions 32 change slightly.

Note that, the balloon 30 illustrated in FIG. 3 has a form of including the four wing portions 32. The four first blade portions 122 are provided in the afore-mentioned pleating section 120 in order to pleat the four wing portions 32.

As in the foregoing, the balloon catheter 10 according to the present embodiment is the balloon catheter 10 including: the balloon 30 with an outer surface coated with a drug; and the protective tube 15 in which the balloon 30 in a state of being folded on an outer peripheral surface of the inner tube 22 (shaft) of the balloon catheter 10 is disposed to an inside of the protective tube 15, in which: the balloon 30 includes the plurality of wing portions 32 that are bent toward the same direction in the circumferential direction of the inner tube 22 while protruding radially outward of the balloon 30, and the plurality of base portions 35 that are in contact with the inner tube 22; the wing portions 32 each include the wing distal end portion 51 that is positioned on a protruding side, the wing proximal end portion 53 that is connected to the base portion 35, and the wing middle portion 52 that is positioned between the wing distal end portion 51 and the wing proximal end portion 53; the wing distal end portion 51 includes the wing distal end outer portion 51A that is directed to the side of the protective tube 15, and the wing distal end inner portion 51B that is directed to the side of the inner tube 22; the wing distal end outer portion 51A contacts the inner peripheral surface of the protective tube 15; inner surfaces of the balloon 30 contact each other to pleat the wing middle portion 52; and the wing middle portion 52 and the wing proximal end portion 53 are separated from the inner peripheral surface of the protective tube 15.

In the balloon catheter 10 configured as the above, sites (i.e., portions) of the balloon 30 other than the wing distal end outer portion 51A do not come into contact with the protective tube 15, which can help suppress the separation of the drug caused by the balloon 30 contacting the protective tube 15. Moreover, the inner surfaces of the balloon 30 contact each other in the wing middle portion 52 when the wing portion 32 is pleated, which is relatively thin, such that it is difficult for the wing portion 32 to contact other sites (i.e., portions) of the balloon 30, which can also help suppress the separation of the drug caused by the wing portion 32 contacting other sites of the balloon 30 (for example, another wing portion 32 and the base portion 35). Moreover, the wing portions 32 are loosely wound, so that compared with a case where the wing portions 32 are tightly (e.g., with no gap) wound, a protection space is formed between the adjacent wing portions 32, and the drug can be protected.

Moreover, the wing middle portion 52 includes the wing middle outer portion 52A that is directed to the side of the protective tube 15, and the wing middle inner portion 52B that is directed to the side of the inner tube 22, and the wing middle inner portion 52B is separated from the adjacent another wing portion 32 and the base portion 35. Accordingly, spaces are formed between the adjacent wing portions 32 and between the wing portion 32 and the base portion 35, respectively, which can help suppress the separation of the drug caused by the wing portion 32 contacting another wing portion 32 and the base portion 35.

Moreover the wing distal end inner portion 51B is separated from the adjacent another wing portion 32 and the base portion 35. Accordingly, spaces are formed between the adjacent wing portions 32 and between the wing portion 32 and the base portion 35, respectively, which can help suppress the separation of the drug caused by the wing portion 32 contacting another wing portion 32 and the base portion 35.

Moreover, in the entire wing middle portion 52, the inner surfaces of the balloon 30 are in contact with each other. Accordingly, the entire wing middle portion 52 is pleated to be thin, so that spaces are likely to be formed between the adjacent wing portions 32 and between the wing portion 32 and the base portion 35, respectively, which can suppress the separation of the drug caused by the wing portion 32 contacting another wing portion 32 and the base portion 35.

Moreover, the present disclosure can also provide a balloon disposing method of disposing the balloon 30 of the balloon catheter 10 in which the balloon 30 with an outer surface coated with a drug is disposed on an outer peripheral surface of the inner tube 22 so as to be inflatable, to an inside of the protective tube 15. The present balloon disposing method includes: pleating the plurality of wing portions 32 that protrude radially outward and the plurality of base portions 35 that are in contact with the inner tube 22, on the balloon 30 while reducing pressure in the inside of the balloon 30; bending the wing portions 32 toward the same direction in the circumferential direction of the inner tube 22 while holding the pressure-reduced state in the inside of the balloon 30; and inserting the balloon 30 into the protective tube 15 while holding the pressure-reduced state in the inside of the balloon 30.

In the balloon disposing method configured as the above, it is possible to insert the balloon 30 into the protective tube 15 while holding the shape of the folded wing portions 32 after the fluid in the inside has been discharged, which can reduce the contact area of the wing portions 32 relative to the protective tube 15, and suppress the wing portions 32 from contacting other sites of the balloon 30. The wing portions 32 can be suppressed from contacting other sites of the balloon 30, and the separation of the drug caused by the wing portions 32 contacting the protective tube 15.

Moreover, in the balloon disposing method, at the step of pleating the wing portions 32, the wing portions 32 may be heated. Accordingly, it is possible to hold the shape of the wing portions 32 in state where the fluid in the inside of the balloon 30 has been discharged.

Moreover, in the balloon disposing method, at the step of folding the wing portions 32, the wing portions 32 may be heated. Accordingly, it is possible to excellently hold the wing portions 32 after the fluid in the inside of the balloon 30 has been discharged in the state of being folded to the inner tube 22.

Moreover, in the balloon disposing method, at the step of pleating the wing portions 32, the wing distal end portion 51 that is positioned on a protruding side, the wing proximal end portion 53 that is connected to the base portion 35, and the wing middle portion 52 that is positioned between the wing distal end portion 51 and the wing proximal end portion 53, are pleated in each of the wing portions 32, and at the step of inserting the balloon 30 into the protective tube 15, the wing distal end outer portion 51A of the wing distal end portion 51 that is directed to the side of the protective tube 15 is brought into contact with the inner peripheral surface of the protective tube 15, and the wing middle portion 52 and the wing proximal end portion 53 are disposed to be separated from the inner peripheral surface of the protective tube 15. Accordingly, sites or portions of the balloon 30 other than the wing distal end outer portion 51A do not come into contact with the protective tube 15, which can help suppress the separation of the drug caused by the balloon 30 contacting the protective tube 15.

Moreover, in the balloon disposing method, at the step of pleating the wing portions 32 and the base portions 35, the flexible films 155 and 156 may be interposed between the plurality of first blade portions 122 arranged so as to surround the balloon 30 in order to press the wing portion 32, and the balloon 30, and at the step of bending the wing portions 32, the flexible films 181 and 182 may be interposed between the plurality of second blade portions 132 arranged so as to surround the balloon 30 in order to bend the wing portion 32, and the balloon 30. Accordingly, when the wing portions 32 and the base portions 35 are pleated on the balloon 30, and when the wing portions 32 are bent, the surface of the balloon 30 can be protected by the films, and the separation of the drug from the balloon 30 can be suppressed. Note that, the forms of the films are not limited to the forms described above.

Note that, the present disclosure is not limited to the above-described embodiment, but various changes by those skilled in the art can be made within the technical scope of the present disclosure. For example, the balloon catheter 10 according to the above-mentioned embodiment is a rapid exchange type, but may be an over-the-wire type.

Figure 12:
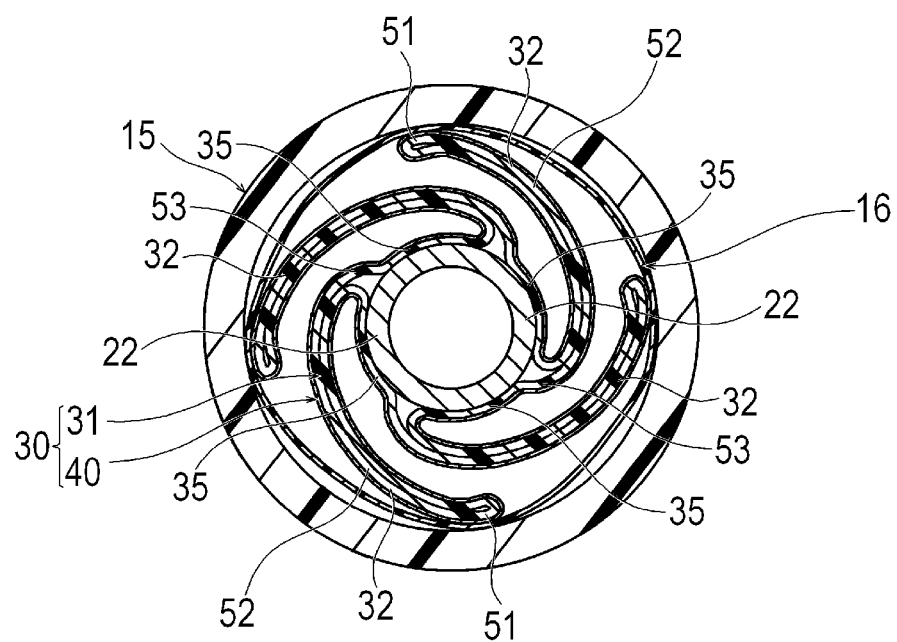
FIG. 12 is a cross-sectional view illustrating a modification example of a balloon catheter.

Moreover, as a modification example illustrated in FIG. 12, the balloon catheter 10 may include a flexible protective film 16 sandwiched between the protective tube 15 and the balloon 30. The protective film 16 can be included in the configuration of the protective tube 15. Accordingly, a drug on the outer surface of the balloon 30 contacts the protective tube 15 via the flexible protective film 16, so that the separation of the drug can be suppressed. Moreover, the protective tube 15 is provided to allow the balloon 30 to be inserted into the protective tube 15, and to be taken out from the protective tube 15 in the state where the balloon 30 is kept to be covered with the protective film 16. Therefore, when the balloon 30 is inserted into the protective tube 15 and/or when the balloon 30 is taken out from the protective tube 15, the separation of the drug caused by rubbing of the wing portions 32 against the protective tube 15 can be suppressed.

Moreover, the balloon 30 does not need to include the drug-coated layer 40. In the balloon catheter 10 according to the present embodiment, even when the drug-coated layer 40 is not included (i.e., the balloon 30 with no-drug coating), the occurrence of the back fold can be suppressed, and the folded balloon 30 inflates rather easily without the occurrence of the back fold.

Moreover, the pleating section and the folding section may be provided to different devices.

The detailed description above describes embodiments of a balloon catheter and a balloon arrangement method. The invention is not limited, however, to the precise embodiments and variations described. Various changes, modifications and equivalents may occur to one skilled in the art without departing from the spirit and scope of the invention as defined in the accompanying claims. It is expressly intended that all such changes, modifications and equivalents which fall within the scope of the claims are embraced by the claims.

What is claimed is:

1. A balloon catheter comprising:
a balloon with an outer surface coated with a drug;
a protective tube in which the balloon in a state of being folded on an outer peripheral surface of a shaft of the balloon catheter is arranged to an inside of the protective tube;
the balloon includes a plurality of wing portions that are bent toward a same direction in a circumferential direction of the shaft while protruding radially outward of the balloon, and a plurality of base portions that are in contact with the shaft;
each of the plurality of wing portions includes a wing distal end portion that is positioned on a protruding side, a wing proximal end portion that is connected to the base portion, and a wing middle portion extending from the wing distal end portion to the wing proximal end portion;
the wing distal end portion includes a wing distal end outer portion that is directed to a side of the protective tube, and a wing distal end inner portion that is directed to a side of the shaft, the wing distal end outer portion contacts an inner peripheral surface of the protective tube, and wherein the wing distal end inner portion including the drug on the outer surface of the balloon is separated from an adjacent wing portion;
inner surfaces of the balloon contact each other to pleat the wing middle portion;
the wing middle portion including a wing middle outer portion that is directed to the side of the protective tube, a wing middle inner portion that is directed to the side of the shaft, and wherein the wing middle inner portion is separated from the adjacent wing portion and an entirety of inner surfaces of the wing middle portion are in contact with one another;
wherein each of the plurality of wing portions that are bent toward the same direction in the circumferential direction overlies and partially covers the adjacent wing portion; and
the wing middle portion and the wing proximal end portion are separated from the inner peripheral surface of the protective tube.

2. The balloon catheter according to claim 1, further comprising:
a flexible protective film that is sandwiched between the protective tube and the balloon.

3. The balloon catheter according to claim 1, wherein the entirety of the wing middle portion does not contact the inner peripheral surface of the inner tube.

4. The balloon catheter according to claim 1, wherein each of the plurality of wing portions has another of the plurality of wing portions that overlies and partially covers the wing middle portion of the adjacent wing portion.

5. The balloon catheter according to claim 1, wherein a number of the plurality of wing portions is four.

6. A method of arranging the balloon of the balloon catheter according to claim 1, to the inside of the protective tube, the method comprising:
pleating the plurality of wing portions that protrude radially outward and the plurality of base portions that are in contact with the shaft, while reducing pressure in an inside of the balloon;
bending the plurality of wing portions to the same direction in the circumferential direction of the shaft while holding a pressure-reduced state in the inside of the balloon; and
inserting the balloon into the protective tube while holding the pressure-reduced state in the inside of the balloon.

7. The method according to claim 6, further comprising:
heating the plurality of wing portions during the pleating of the plurality of wing portions that protruding radially outward and the plurality of base portions that are in contact with the shaft.

8. The method according to claim 6, further comprising:
heating the plurality of wing portions while the bending of the plurality of wing portions to the same direction in the circumferential direction of the shaft while holding the pressure-reduced state in the inside of the balloon.

9. The method according to claim 6, further comprising:
disposing a flexible protective film between the balloon and the protective tube during the inserting of the balloon into the protective tube while holding the pressure-reduced state in the inside of the balloon.

10. The method according to claim 6, wherein the plurality of wing portions that protrude radially outward and the plurality of base portions that are in contact with the shaft further comprises:
positioning the wing distal end portion on a protruding side, connecting the wing proximal end portion to the base portion, and positioning the wing middle portion between the wing distal end portion and the wing proximal end portion in each of the plurality of wing portions during the pleating of the plurality of wing portions; and
directing the wing distal end outer portion of the wing distal end portion to a side of the protective tube and bringing the wing distal end outer portion of the distal wing end portion into contact with the inner peripheral surface of the protective tube, and disposing the wing middle portion and the wing proximal end portion of the wing distal end outer portion of the wing distal end portion so as to be separated from the inner peripheral surface of the protective tube during the inserting of the balloon into the protective tube.

11. The method according to claim 6, further comprising:
interposing a flexible film between a plurality of first blade portions that are arranged so as to surround the balloon in order to press the wing portions, and the balloon during the pleating of the plurality of wing portions and the plurality of base portions; and
interposing a flexible film between a plurality of second blade portions that are arranged so as to surround the balloon in order to bend the wing portions, and the balloon during the bending of the plurality of wing portions.

12. The method according to claim 6, further comprising:
disposing the balloon to an inner side of a plurality of first blade portions of a balloon folding device;
injecting an inflation fluid into the inside of the balloon to obtain a pressure-applied state of the balloon;
moving the first blade portions toward the balloon in the pressure-applied state;
moving the plurality of first blade portions into contact with the balloon in the pressure-applied state; and
pleating the plurality of wing portions that protrude radially outward on the balloon with the plurality of first blade portions while the inflation fluid is gradually discharged from the inside of the balloon.

13. The method according to claim 12, wherein the balloon folding device includes a plurality of second blade portions, the method further comprising:
 bending the plurality of wing portions with the plurality of second blade portions.

14. A method of arranging the balloon of the balloon catheter according to claim 1, to the inside of the protective tube, the method comprising:
 injecting an inflation fluid into an inside of the balloon to obtain a pressure-applied state of the balloon;
 pleating the plurality of wing portions that protrude radially outward and the plurality of base portions that are in contact with the shaft while aspirating the inflation fluid from the inside of the balloon, wherein the plurality of wing portions that protrude radially outward and the plurality of base portions that are in contact with the shaft further comprises:
  positioning the wing distal end portion on a protruding side, connecting the wing proximal end portion to the base portion, and positioning the wing middle portion between the wing distal end portion and the wing proximal end portion in each of the plurality of wing portions during the pleating of the plurality of wing portions; and
  directing the wing distal end outer portion of the wing distal end portion to a side of the protective tube and bringing the wing distal end outer portion of the distal wing end portion into contact with the inner peripheral surface of the protective tube;
 folding the plurality of wing portions to the same direction in the circumferential direction of the shaft while holding a pressure-reduced state in the inside of the balloon; and
 inserting the balloon into the protective tube with the balloon in the pressure-reduced state in the inside of the balloon.

15. The method according to claim 14, further comprising:
 heating the plurality of wing portions during the pleating of the plurality of wing portions that protruding radially outward and the plurality of base portions that are in contact with the shaft.

16. The method according to claim 14, further comprising:
 heating the plurality of wing portions while the bending of the plurality of wing portions to the same direction in the circumferential direction of the shaft while holding the pressure-reduced state in the inside of the balloon.

17. The method according to claim 14, further comprising:
 disposing a flexible protective film between the balloon and the protective tube during the inserting of the balloon into the protective tube while holding the pressure-reduced state in the inside of the balloon.

18. The method according to claim 14, further comprising:
 disposing the wing middle portion and the wing proximal end portion of the wing distal end outer portion of the wing distal end portion so as to be separated from the inner peripheral surface of the protective tube during the inserting of the balloon into the protective tube.

19. The method according to claim 14, further comprising:
 interposing a flexible film between a plurality of first blade portions that are arranged so as to surround the balloon in order to press the wing portions, and the balloon during the pleating of the plurality of wing portions and the plurality of base portions; and
 interposing a flexible film between a plurality of second blade portions that are arranged so as to surround the balloon in order to bend the wing portions, and the balloon during the bending of the plurality of wing portions.

* * * * *